United States Patent
Aberg et al.

(10) Patent No.: US 10,157,081 B2
(45) Date of Patent: Dec. 18, 2018

(54) TRAINER OF MANY CORE SYSTEMS FOR ADAPTIVE RESOURCE CONTROL

(71) Applicant: Telefonaktiebolaget L M Ericsson (publ), Stockholm (SE)

(72) Inventors: Patrik Aberg, Sodra Sandby (SE); Staffan Mansson, Akarp (SE); Magnus Templing, Lund (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 215 days.

(21) Appl. No.: 14/911,263

(22) PCT Filed: Nov. 13, 2015

(86) PCT No.: PCT/EP2015/076537
§ 371 (c)(1),
(2) Date: Feb. 9, 2016

(87) PCT Pub. No.: WO2017/080613
PCT Pub. Date: May 18, 2017

(65) Prior Publication Data
US 2017/0255490 A1    Sep. 7, 2017

(51) Int. Cl.
*G06F 9/50* (2006.01)
*G06F 9/48* (2006.01)
(Continued)

(52) U.S. Cl.
CPC ........... *G06F 9/505* (2013.01); *G06F 9/4881* (2013.01); *G06F 9/4887* (2013.01); *G06F 9/50* (2013.01); *G06N 5/00* (2013.01); *G06N 99/005* (2013.01)

(58) Field of Classification Search
None
See application file for complete search history.

(56) References Cited

U.S. PATENT DOCUMENTS

2002/0120661 A1* 8/2002 Binns .................... G06F 9/4887
                                                                            718/102
2005/0240923 A1* 10/2005 Duke .................... G06F 9/4881
                                                                            718/100
(Continued)

FOREIGN PATENT DOCUMENTS

| FR | 2997774 A1 | 5/2014 |
| WO | 2014104912 A1 | 7/2014 |
| WO | 2015050594 A2 | 4/2015 |

OTHER PUBLICATIONS

PCT International Search Report, dated Jul. 14, 2016, in connection with International Application No. PCT/EP2015/076537, all pages.
(Continued)

*Primary Examiner* — Qing Yuan Wu
(74) *Attorney, Agent, or Firm* — Leffler Intellectual Property Law, PLLC

(57) ABSTRACT

Disclosed herein is a trainer of a many core system comprising a plurality of cores for controlling resource utilization within the many core system, wherein the trainer comprises a controller configured to cause a task scheduler to add a first synthetic variable load (202, 302) to at least one task thread comprising at least one task and to schedule the at least one task thread; cause a generic probe element (205, 305) to set a plurality of probes configured to measure a real time requirement at a respective plurality of points within an execution of the at least one task thread; cause a training element (204, 304) to calculate a real time slack measurement constant (RS) value based on the worst case timing for each of the plurality of probes and to select at least one of the plurality of probes, wherein the selected at least one probe has a worst case RS value, wherein the training element is further configured to calculate a system load constant (SL) value based on the worst case RS value; and to cause a resource manager to adjust at least one system (Continued)

parameter based on the at least one probe having the worst case RS value. Also disclosed is a method of a trainer and a computer program product.

15 Claims, 2 Drawing Sheets

(51) Int. Cl.
    *G06N 5/00*         (2006.01)
    *G06N 99/00*      (2010.01)

(56) References Cited

U.S. PATENT DOCUMENTS

2010/0088706 A1    4/2010   Dong et al.
2014/0129811 A1    5/2014   Yamauchi et al.

OTHER PUBLICATIONS

PCT Written Opinion, dated Jul. 14, 2016, in connection with International Application No. PCT/EP2015/076537, all pages.

\* cited by examiner

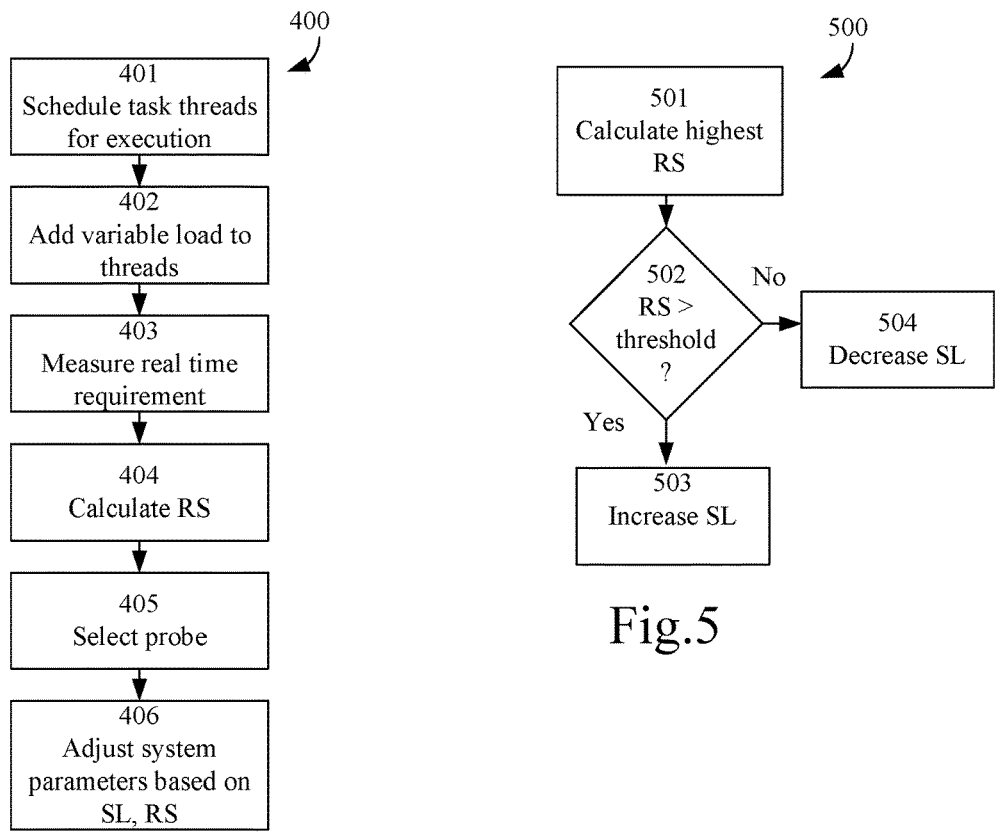
Fig.4
Fig.5
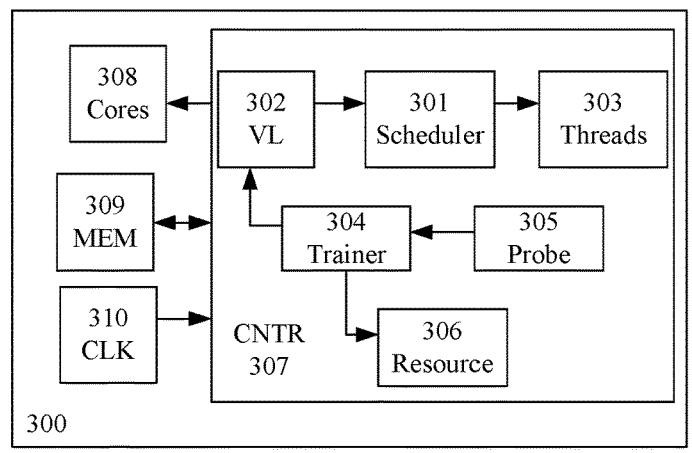
Fig.3
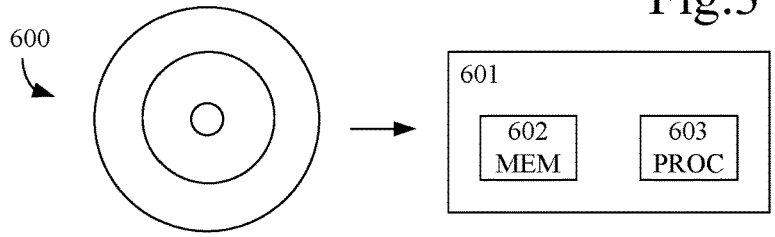
Fig.6

TRAINER OF MANY CORE SYSTEMS FOR ADAPTIVE RESOURCE CONTROL

TECHNICAL FIELD

The present invention relates generally to the technical field of embedded systems. More particularly, it relates to an energy efficient trainer for many core systems for adaptive resource control.

BACKGROUND

In computer systems there may exist a whish to investigate system utilization in the cores. Reasons for this may e.g. be resource pool control in a cloud or to facilitate power saving in embedded systems. In the first case, knowledge may be gained regarding when to increase the system resource pool and in the latter when to go into a less performance/less power mode of execution. Typically, some kind of average load is measured as a percentage of system execution and a hysteresis is used to regulate system frequency and resources in time before passing the border where it may not be possible to meet real-time requirements any longer. That is, system idle time is typically measured in order to determine how much more resources the system has available to execute a task.

However as the amount of cores grows into hundreds or even thousands it typically gets increasingly more complex to accurately determine the hysteresis of the system. This in turn may lead to that the regulation of system frequency and resources are erroneous.

Therefore, there is a need for a trainers and methods of many core systems which enable accurate measurement of system utilization and may perform adaptive resource control.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It is an object of some embodiments to mitigate at least some of the above disadvantages and to provide a trainer of a many core system as well as methods of a trainer of a many core system for enabling accurate measurement of system idle time and efficient utilization of system resources.

According to a first aspect, this is achieved by a trainer of a many core system comprising a plurality of cores for controlling resource utilization within the many core system. The trainer comprises a controller configured to:

Cause a task scheduler to add a first synthetic variable load to at least one task thread comprising at least one task and to schedule the at least one task thread for execution by the many core system during a first execution cycle; wherein the synthetic variable load is added to the beginning of the at least one task thread.

Cause a generic probe element to set a plurality of probes configured to measure a real time requirement at a respective plurality of points within execution of the at least one task thread during the first execution cycle and to rank the plurality of probes according to a worst case timing.

Cause a training element to calculate a real time slack measurement constant—RS—value based on the worst case timing for each of the plurality of probes and to select at least one of the plurality of probes, wherein the selected at least one probe has a worst case RS value, wherein the training element is further configured to determine a system load constant—SL—value based on the worst case RS value, and wherein a second synthetic variable load is calculated based on the at least one probe having the worst case RS value and the SL value for use in a second execution cycle subsequent to the first execution cycle.

Cause a resource manager (206, 306) to adjust at least one system parameter based on the at least one probe having the worst case RS value, wherein the adjusted system parameter is utilized in the second execution cycle and associated to the worst case RS value.

In some embodiments, the synthetic variable load is a time delay added to the beginning of each scheduled task thread in order to control a delay of the execution of the task thread.

In some embodiments, the synthetic variable load may be proportional to the at least one task of the task thread.

Since the synthetic variable load is proportional to the task, it may accurately simulate how or if a possible change of frequency may affect the performance of the many core system.

In some embodiments, the synthetic variable load (SL) may be determined according to $SL*(t1-t0)$ based on a real time slack measurement (RS), wherein t0 equals a start of an execution of the at least one task thread, and t1 equals an end of the execution of the at least one task thread.

The synthetic variable load demands no power to be executed, but functions as a delay of the task thread.

In some embodiments, the real time requirement is expressed in one or more of the following, radio network time, network time protocol—NTP and/or Greenwich Mean Time—GMT—and the worse case timing is a worse-case real-time behavior for each of the plurality of probes.

In some embodiments, the real time requirement may be expressed in any type of suitable time. E.g. an external time source may be used, such as an external clock.

In some embodiments, the at least one system parameter may be at least one of the following: a system frequency and a resource pool.

The resource pool may e.g. comprise system memory, system cores and/and or system cache. The at least one system parameter may in some embodiments pertain to adapting the system voltage.

In some embodiments, the resource manager may be configured to receive information from the training element pertaining to an effect of the adjusted associated system parameter on the worst case RS value and further adjust the associated system parameter based on the received information.

In some embodiments, the training element and the resource manager may constitute a training mechanism configured to train the many core system to recognize a certain use case based on the calculated RS-value for each of the plurality of probes and apply the associated adjusted system parameters to that certain use case.

In some embodiments, the RS values and associated system parameters may be stored in a memory for use in future executions cycles.

In some embodiments, the controller may be further configured to cause the thread scheduler to determine, based on the second synthetic variable load and the worst case timing of the plurality of probes, if the system parameters needs adjustment in one core of the plurality of cores, or in the entire plurality of cores, or in a subset of the plurality of cores in the many core system.

A second aspect is a method of a trainer of a many core system comprising a plurality of cores for controlling resource utilization within the many core system. The method comprising:

Add a first synthetic variable load to at least one task thread comprising at least one task and to schedule the at least one task thread for execution by the many core system during a first execution cycle; wherein the synthetic variable load is added to the beginning of the at least one task thread.

Set a plurality of probes configured to measure a real time requirement at a respective plurality of points within the at least one task thread during the first execution cycle and to rank the plurality of probes according to a worst case timing.

Calculate a real time slack measurement constant RS value based on the worst case timing for each of the plurality of probes and to select at least one of the plurality of probes, wherein the selected at least one probe has a worst case RS value, and to determine a system load constant SL value based on the worst case RS value, and wherein a second synthetic variable load is calculated based on the at least one probe having the highest RS value and the SL value for use in a second execution cycle subsequent to the first execution cycle.

Adjust at least one system parameter based on the at least one probe having the highest RS value; wherein the adjusted system parameter is utilized in the second execution cycle and associated to the highest RS value.

In some embodiments, the variable load may be proportional to the at least one task in the task thread.

In some embodiments, the synthetic variable load may be determined according to $SL*(t1-t0)$, wherein $t0$ equals a start of an execution of the at least one task thread, and $t1$ equals an end of the execution of the at least one task thread.

In some embodiments, the real time requirement may be is expressed in one or more of the following, radio network time, network time protocol—NTP and/or Greenwich Mean Time—GMT—and the worse case timing is a worse-case real-time behavior for each of the plurality of probes.

In some embodiments, the real time requirement may be expressed in any type of suitable time. E.g. an external time source may be used, such as an external clock.

In some embodiments, the at least one system parameter may be at least one of the following: a system frequency and a resource pool.

The resource pool may e.g. comprise system memory, system cores and/and or system cache. The at least one system parameter may in some embodiments pertain to adapting the system voltage.

In some embodiments, the method may further comprise receiving, by a resource manager, information from a training element pertaining to an effect of the adjusted associated system parameter on the worst case RS value and further adjust the associated system parameter based on the received information.

In some embodiments, the training element and the resource manager may constitute a training mechanism that trains the many core system to recognize a certain use case based on the calculated RS value for each of the plurality of probes and apply the associated adjusted system parameters to that certain use case.

In some embodiments, the RS values and associated system parameters may be stored in a memory for use in future executions cycles.

In some embodiments, the method may further comprise determining, based on the second synthetic variable load and the worst case timing of the plurality of probes, if the system parameters need adjustment in one core of the plurality of cores, or in the entire plurality of cores, or in a subset of the plurality of cores in the many core system.

A third aspect is a computer program product comprising a computer readable medium, having thereon a computer program comprising program instructions, the computer program being loadable into a data-processing unit comprising a processor and a memory and adapted to cause the data-processing unit to execute at least the steps of the method according to the second aspect when the computer program is run by the data-processing unit.

In some embodiments, the second aspect may additionally have features identical with or corresponding to any of the various features as explained above for the first aspect.

An advantage of some of the embodiments is that an accurate measurement of real-time slack (system idle time) that may be used to scale up/down system frequency and/or change the amount pooling resources being used by the system is enabled.

Another advantage of some of the embodiments is that the running system also may determine before-hand how a frequency change will affect the real-time requirements compared to network time, giving the system the possibility to lower the system frequency to a larger extent compared to prior art solutions and still meet real-time requirements.

Another advantage of some of the embodiments is that training of the system so that optimal frequency schemes can be detected for new or changing real-time requirements not foreseeable at design time and not being detected by a typical idle time measurement regulator is enabled. This in turn provides a flexible solution.

Another advantage of some of the embodiments is that in test rigs, up-to-date feedback to design about how much slack can be utilized in the system for new features may be provided.

BRIEF DESCRIPTION OF THE DRAWINGS

Further objects, features and advantages will appear from the following detailed description of embodiments, with reference being made to the accompanying drawings, in which:

FIG. 3 is a flowchart illustrating an example method according to some embodiments;

FIG. 4 is a flowchart illustrating an example method according to some embodiments; and FIG. 5 is a schematic drawing illustrating a computer program product according to some embodiments.

DETAILED DESCRIPTION

Figure 1:
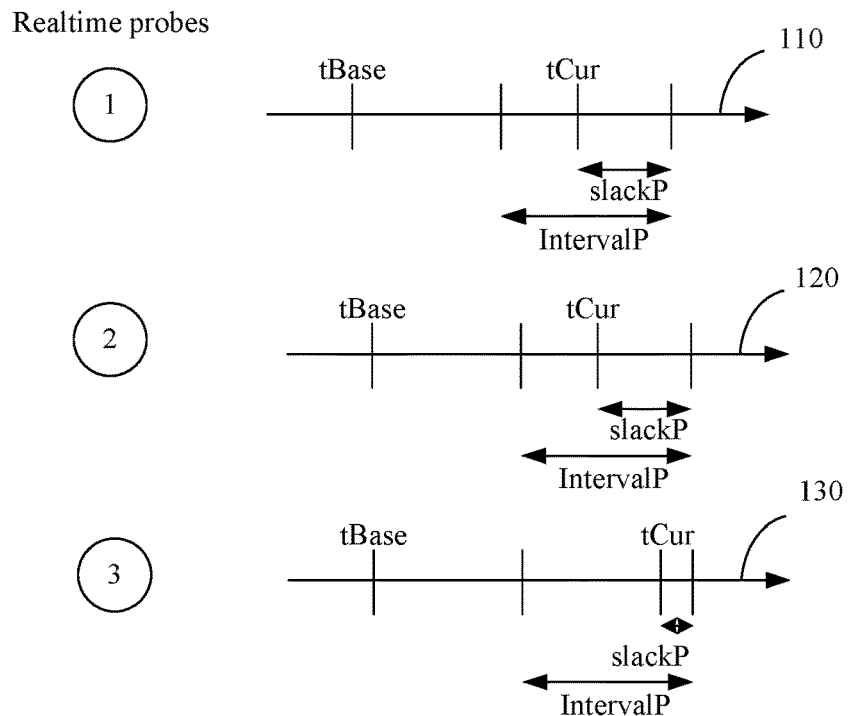
FIG. 1 is a schematic drawing illustrating an example scenario according to some embodiments.

In the following, embodiments will be described where a many core system having adaptive resource control is enabled by means of an energy efficient trainer.

A problem with earlier solutions when measuring system utilization is that they do not take the programming model and the real-time characteristics of the network into account. This means that the hysteresis, i.e. the idle time of the system, will always be unknown. This may lead to the system getting defensive, i.e. the system will typically be very restrictive in changing system frequency since it does not know the correct amount of resources available leading to that valuable power may be wasted when executing tasks since the frequency is set unnecessarily high.

In addition to this, design time use-case dependent mechanisms may be added on top of each other in order to give the system a hint of what is going to happen in the future.

However, as the amount of cores increases, the concept of idle time gets increasingly complex and the connection between the computer system idle time and the available real-time capacity used for the network components will diverge more and more.

In many core systems this problem is particularly prominent. A many core system may comprise dozens, hundreds or even thousands of cores and the large amount of cores may typically give rise to the above identified divergence between system idle time and the available real-time capacity used for the network components.

This means that the kind of computer system regulators used today may become too inaccurate to be able to translate into real-time requirements of a network system in a many core system.

The inventors have realized after insightful reasoning that by connecting the system to a well-known time base, for example network time, it is possible to, very accurately, regulate system resources to match system utilization.

This means that it is not the slack of the computer system that is measured, but the real-time slack compared to network time. This may give information on how much available resources the system has for executing additional network tasks which it also may be part of.

In some embodiments, this is realized by, in a reoccurring execution cycle, incorporating:

1. A synthetic variable load, which acts as a time delay for a task thread and does therefore not consume energy (controlled sleep i.e. the thread is set to sleep in order to delay the execution), the synthetic variable load is incorporated in a thread scheduler for a many core system or a cloud and is applied in the beginning of all threads scheduled for execution during a first execution cycle by the many core system. The variable load can be calculated as $SL*(t1-t0)$ where $t0$ equals thread start execution and $t1$ thread end execution times and where SL is a system load constant value.

2. A generic probe mechanism incorporated into those places in the execution of the task thread where a certain real-time requirement exist. The real-time requirement may e.g. be expressed in radio network time. The probes may be continuously ranked in a list based on worst-case real-time behavior when executed. This data is then being used by a training mechanism (see bullet 3 and 4).

3. A training element that iterates through the probes and calculates a real time slack measurement constant—RS—value based on the worst-case real-time behavior of the probes. The worst case RS value of the probes is then used in order to calculate the SL value (see bullet 1) for the next measurement period and a new synthetic variable load may be determined based on RS and SL.

4. A system performance/resource manager that adjusts at least one of a system frequency, a resource pool and underlying parameters e.g. voltage with the aim to keep the real time slack constant RS to a minimum, thus utilizing the system in the most energy efficient way. The resource manager may receive information from the training mechanism (bullet 3) pertaining to the effect of a possible frequency change on the many core system since the training mechanism controls the synthetic variable load (bullet 1).

Since the synthetic variable load (which does not consume energy) is proportional to the individual tasks being performed by the many core system itself, the effect of changing frequency is also proportional to the synthetic load and can thus be calculated. In this way, the training element and the resource manager constitutes a training mechanism. The training mechanism can thus train the many core system to recognize a certain use-case and associate an optimal frequency or other system parameter with that certain use-case. Thus, whenever that certain use case occurs, e.g. whenever a user uses a certain app or function, the system will automatically know which parameters should be set in order to utilize resources in the most efficient manner.

In a best-effort system where real-time requirements come from end-user experience this is particularly valuable since the real-time requirements will change depending on end-user behavior and a training mechanism can be much more effective in meeting low power/great experience than a rough idle regulator doing the same mistakes every time the user perform the same task 5. A task scheduler using SL and RS to decide if it should spread tasks/threads over a larger amount of cores or if it is sufficient to queue up jobs on available cores or to only adjust frequency of the cores. The task scheduler may add the synthetic load (bullet 1) to the beginning execution of every thread scheduled.

The synthetic variable load along with the plurality of probes will present the trainer with a way to accurately measure how a change of frequency would affect system performance. E.g. if the synthetic variable load adds 5% to the execution time, then the trainer will know how a 5% decrease in system frequency will affect the execution time.

In order to calculate the real time slack measurement constant value (RS). an interval being defined by the many core system which indicates how long a task may take is utilized.

In FIG. 1 this is illustrated by intervalP on intervals 110, 120 and 130.

Intervals 110, 120 and 130 each represents intervals where probes 1, 2 and 3 respectively have been set to measure a real time requirement during execution of a task thread.

tCur illustrates where one or more probes have measured a real time requirement, and the interval slackP illustrates how much idle time the system has after executing the scheduled task thread. The real time slack measurement constant value, RS. may be calculated by dividing slackP with intervalP, in this way a percentage is obtained.

If tCur moves towards either of the edges of the intervalP, then that is an indication that the system frequency needs to be adjusted. However, tCur may also indicate if a change of frequency is possible. E.g. if tCur is positioned in the vicinity of the middle of intervalP that is an indication that decrease in frequency is possible, and the system parameters may be adjusted accordingly.

In some embodiments, tCur may indicate the worst case timing on which the RS value may be based.

The RS value may be calculated for each of the probes 1, 2 and 3 and their respective intervals.

E.g. the probes 1, 2 and 3 all measure real time requirement within execution of a task thread during intervals 110, 120 and 130 respectively. As mentioned above, intervalP defines an interval within which tCur should preferably be inside.

Probes 1 and 2 indicate that there is room for frequency adjustment, i.e. calculation of RS will yield a high percentage, whereas probe 3 indicates that the execution time is near the interval edge on the right, i.e. the execution time is nearing a maximum allowable time and RS for probe 3 will yield a low percentage (since the slackP will be small compared to intervalP).

Thus in order to ensure that the tasks of the task thread are properly executed, RS calculated for probe 3 will determine how the system parameters and the size of the synthetic variable load to be used on the thread during a subsequent execution cycle may be adjusted. The RS-value for probe 3 represents the worse case RS-value, i.e. the lowest RS-value among the probes 1, 2 and 3.

The variable load is linked to the system frequency such that it may indicate if there is room for frequency adjustment. E.g. the variable load may be increased in order to see if the system frequency can be decreased. If an increase in variable load results in an unchanged lowest RS-value or an increasing lowest RS-value then that is an indication that the system can afford a decreased frequency and still be able to carry out the tasks within the prescribed time interval.

On the opposite, if the variable load is decreased, or entirely removed, while the worst case RS-value stays low (e.g less than 10%) or is further decreased, then that is an indication that the frequency should be increased.

In some embodiments, the RS-value may be deemed high if it is above 50% or 0,5, however other values are of course possible. E.g. if all probes yields a RS-value higher than 50%, then the probe having the lowest percentage will be deemed to have the worst case RS-value.

In some embodiments the worst case RS-value may be calculated as a normalized vector according to the following formula $$\frac{\left| t_p + \frac{t_1 + t_0}{2} \right|}{t_1 - t_0} * 2$$

wherein t0 equals a start of a thread execution and t1 equals an end of the thread execution and tp is the probe activation time.

Figure 2:
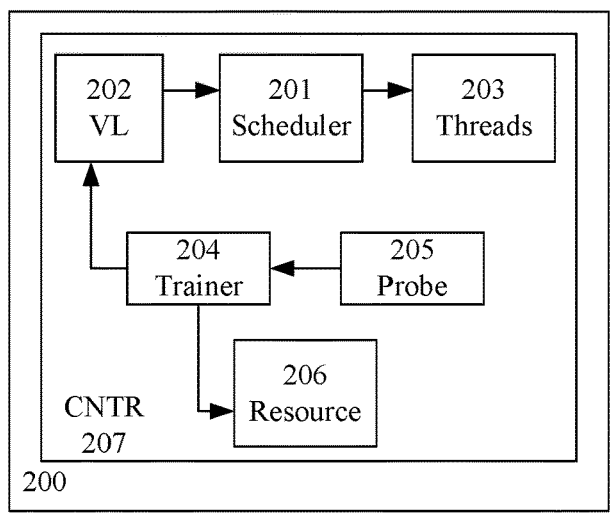
FIG. 2 is a block diagram illustrating an example arrangement according to some embodiments.

FIG. 2 illustrates an example arrangement 200 of a trainer according to some embodiments. The example arrangement 200 may in some embodiments comprise elements as described in FIG. 1.

The arrangement 200 comprises controller 207 (CNTR) comprising a thread scheduler (Scheduler) 201, a synthetic variable load (VL) 202, a thread element (Threads) 203, a training element 204 (Train), a generic probe mechanism 205 (Probe), and system performance/resource manager 206 (Resource).

The arrangement 200 may in some embodiments be comprised in a many core system comprising a plurality of cores (not shown) for controlling resource utilization.

In some embodiments, the synthetic variable load 202 (also referred to simply as variable load in this disclosure) may be comprised and/or generated within the thread scheduler 201. The thread scheduler 201 may be configured to schedule a plurality of task threads (203) for execution by the many core system. The task threads may be generated by the thread element 203 based on incoming tasks to the many core system. The tasks may be generated within the many core system itself, or they may be a product of the surrounding network in which the many core system may be a part.

The variable load 202 may be added to the beginning of each scheduled thread to be executed in order to accurately simulate the real time slack.

In some embodiments, the variable load may be seen as a time delay that simulates idle time of the system. By adding the time delay to the beginning of a task thread, it is ensured that the tasks within the thread also are correctly delayed. A task within the thread may trigger other events, and it is preferable that these triggers are delayed according to the variable load, which would not be the case if the variable load is added to the end of the task thread.

In some embodiments, the variable load 202 may be proportional to the corresponding task being executed in the task thread. Having the variable load 202 proportional to the individual corresponding tasks in the task threads makes it possible to calculate an optimal change of frequency in order to provide an as energy efficient utilization of the many core system as possible since the effect of changing the frequency will be proportional to the variable load.

Thus, the variable load simulates how much idle time the system has and thus how much frequency may be lowered before its performance is degraded (compare with intervalP and slackP in FIG. 1).

The synthetic variable load 202 may in some embodiments be determined according to SL*(t1−t0), wherein t0 equals a start of a thread execution and t1 equals an end of the thread execution.

The generic probe element 205 may set a plurality of probes at various measurement points during the execution of the scheduled task threads. The measurement points may represent places within execution of the task thread where a certain real time requirement exist. E.g. a probe may be set at a task in the task thread in order to measure how long time it took to execute the task.

The generic probe element 205 may then iterate through the probes in order to measure a plurality of real time requirements of the many core system. In some embodiments, the real time requirements may be the actual real time requirements since the generic probe element may iterate through the probes of the executed threads.

In some embodiments, the real time requirements may be a predicted real time requirement, since the generic probe element may iterate trough the probes of scheduled threads before they are executed.

Regardless of whether the plurality of probes measure the real time requirements for a current or previous execution cycle, the plurality of probes may in some embodiments be ranked according to a worst case timing, wherein the worst case timing is based on the measured plurality of real time requirements. Thus, if a certain task requires long time to be executed e.g. 100 ms, the real time requirement for that particular task may be ranked high according to the worst case timing.

The real time requirement may be expressed in radio network time and the worse case timing may in some embodiments be a worse-case real-time behavior for each probe.

The real time requirement may in some embodiments be is expressed in one or more of the following, radio network time, network time protocol—NTP and/or Greenwich Mean Time—GMT—and the worse case timing is a worse-case real-time behavior for each of the plurality of probes.

In some embodiments, the real time requirement may be expressed in any type of suitable time. E.g. an external time source may be used, such as an external clock.

Furthermore, the training element 204 is configured to calculate a real time slack measurement constant (RS) value (e.g. as described in conjunction with FIG. 1) for each of the plurality of probes and then select at least one of the plurality of probes, wherein the selected at least one probe may have the worst case RS value according to the worst case timing. The training element 204 is configured to calculate a system load constant SL based on the worst case RS value in order to determine a new variable load for use in a next execution cycle. The next execution cycle may be the execution cycle subsequent to the previous or current execution cycle.

The resource manager 206 is configured to adjust at least one system parameter based on the worst case RS value.

The adjusted system parameter is utilized in the next execution cycle period and is associated to the worst case RS value.

The variable load functions as a simulation of a possible change of frequency in the many core system. Increasing the variable load with a certain percentage corresponds to decreasing the system frequency with the same percentage and vice versa. Thus, it may accurately be calculated how a change of system parameters, e.g. lowering the system frequency affects the performance of the many core system by means of adding a time delay (variable load) and measure how this delay affects execution times.

The resource manager 206 may further be configured to receive information from the training element pertaining to an effect of the adjusted system parameter on the calculated RS-value for each of the plurality of probes and further adjust the system parameters based on the received information. Thus, optimal system parameters may be determines for a certain use case (i.e. task thread).

The RS values for each of the plurality of probes may constitute a pattern which the resource manager may interpret.

In this sense the training element 204 and the resource manager 206 may constitute a training mechanism that may train the many core system to associate a certain RS value and SL value to a certain use case along with a corresponding optimally adjusted system parameter. Thus the training mechanism is configured to train the many core system to recognize a certain use case based on the calculated RS value and SL value and apply the associated system parameters to the certain use case whenever it occurs.

Since RS and SL are based on actual real time, i.e. network time, hysteresis will be known and system frequency and/or system resources may be adapted accurately to provide optimal performance of the many core system.

The training mechanism also makes it possible to evaluate a possible change of frequency before actually changing the frequency. This may provide for a more efficient many core system.

In some embodiments, the system parameters may e.g. be at least one of a system frequency, a resource pool such as system memory, system cores and system cache, and a system voltage.

FIG. 3 illustrates an example arrangement 300 according to some embodiments.

The arrangement 300 comprises a core element (Core) 308 comprising a plurality of cores, a memory (MEM) 309, a clock source 310, and a controller 307 (CNTR) comprising a thread scheduler (Scheduler) 301, a synthetic variable load (VL) 302, a thread element (Threads) 303, a training element 304 (Trainer), a generic probe mechanism 305 (Probe), and a system performance/resource manager (Resource) 306.

The system 300 may e.g. comprise any of the components described in FIG. 2. The system 300 may in some embodiments be combined with the system 200 described in FIG. 2.

The example arrangement 300 may in some embodiments be configured to carry out the method as described in FIG. 1.

In some embodiments, the synthetic variable load 302 (also referred to simply as variable load in this disclosure) may be comprised and/or generated within the thread scheduler 301. The thread scheduler 301 may be configured to schedule a plurality of task threads 303 for execution by the many core system. The task threads may be generated by the thread element 303 based on incoming tasks to the many core system. The tasks may be generated within the many core system itself, or they may be a. product of the surrounding network in which the many core system may be a part.

The variable load 302 may be added to the beginning of each scheduled thread to be executed in order to accurately simulate the real time slack.

In some embodiments, the variable load may be seen as a time delay that simulates idle time of the system. By adding the time delay to the beginning of a task thread, it is ensured that the tasks within the thread also are correctly delayed. A task within the thread may trigger other events, and it is preferable that these triggers are delayed according to the variable load, which would not be the case if the variable load is added to the end of the task thread.

In some embodiments, the variable load 302 may be proportional to the corresponding task being executed in the task thread. Having the variable load 302 proportional to the individual corresponding tasks in the task threads makes it possible to determine an optimal change of frequency in order to provide an as energy efficient utilization of the many core system as possible since the effect of changing the frequency will be proportional to the variable load.

Thus, the variable load simulates how much idle time the system has and how much the system frequency may be adjusted (increased or decreased) without severely affecting performance.

The synthetic variable load 302 may in some embodiments be determined according to $SL*(t1-t0)$, wherein t0 equals a start of a thread execution and t1 equals an end of the thread execution.

The generic probe element 305 may set a plurality of probes at various measurement points during the execution of the scheduled task threads. The measurement points may represent places within execution of the task thread where a certain real time requirement exists. E.g. a probe may be set at a task in the task thread in order to measure how long time it took to execute the task.

The generic probe element 305 may then iterate through the probes in order to measure a plurality of real time requirements of the many core system. In some embodiments, the real time requirements may be the actual real time requirements since the generic probe element may iterate through the probes of the executed threads.

In some embodiments, the real time requirements may be a predicted real time requirement, since the generic probe element may iterate trough the probes of scheduled threads before they are executed.

Regardless of whether the plurality of probes measure the real time requirements for a current or previous measurement period, the plurality of probes may in some embodiments be ranked according to a worst case timing, wherein the worst case timing is based on the measured plurality of real time requirements. Thus, if a certain task requires long time to be executed e.g. 100 ms, the real time requirement for that particular task may be ranked high according to the worst case timing.

The real time requirement may in some embodiments be is expressed in one or more of the following, radio network time, network time protocol—NTP and/or Greenwich Mean Time—GMT—and the worse case timing is a worse-case real-time behavior for each of the plurality of probes.

Furthermore, the training element 304 is configured to calculate a real time slack measurement constant (RS) value (e.g. as described in conjunction with FIG. 1) for each of the plurality of probes and then select at least one of the plurality of probes, wherein the selected at least one probe may have the worst case RS value according to the worst case timing. The training element 304 is configured to determine a system load constant—SL—based on the worst case RS value in order to determine a new variable load for use in a next execution cycle. The next execution cycle may be the execution cycle subsequent to the previous or current execution cycle.

The clock source 310 provides the arrangement 300 with a system time which may be used for measuring real time requirements and worst case timing on which calculations of RS and SL may be based.

The resource manager 306 is further configured to adjust at least one system parameter based on the worst case RS value.

The adjusted system parameter is utilized in the next execution cycle period and associated to the worst case RS value.

The variable load functions as a simulation of a possible change of frequency in the many core system. Increasing the variable load with a certain percentage corresponds to decreasing the system frequency with the same percentage. Thus, it may accurately be determined how a change of system parameters, e.g. lowering the system frequency affects the performance of the many core system by means of adding a time delay (variable load) and measure how this delay affects execution times.

The resource manager 306 may further be configured to receive information from the training element pertaining to an effect of the adjusted system parameter on the worst case RS value and further adjust the system parameters based on the received information. Thus, optimal system parameters may be determines for a certain use case (i.e. task thread).

In this sense the training element 304 and the resource manager 306 may constitute a training mechanism that may train the many core system to associate a certain RS and SL to a certain use case along with a corresponding optimally adjusted system parameter. Thus the training mechanism is configured to train the many core system to recognize a certain use case based on the calculated RS-value for each of the plurality of probes and apply the associated adjusted system parameters to that certain use case whenever it occurs.

Since RS and SL may be based on actual real time, e.g. network time (e.g. time provided by clock source 310), hysteresis will be known and system frequency and/or system resources may be adapted accurately to provide optimal performance of the many core system.

The training mechanism also makes it possible to evaluate a possible change of frequency before actually changing the frequency. This may provide for a more efficient many core system.

In some embodiments, the system parameters may e.g. be at least one of a system frequency, a resource pool, and a system voltage.

The thread scheduler 301 may further be configured to determine, based on RS and SL, if the amount of system resources is sufficient in one core out of the plurality of cores in the core element 308 for handling a task, or if the task should be split on the entire plurality of cores in the core element 308.

In some embodiments, the thread scheduler may determine based on the second synthetic variable load and the worst case timing of the plurality of probes, if the system parameters needs adjustment in one core of the plurality of cores, or in the entire plurality of cores, or in a subset of the plurality of cores in the many core system.

The thread scheduler 301 may also in some embodiments access the probe rankings as an input for scheduling tasks on the current system level (e.g. RBS) as well as for tasks scheduled on the network level.

In some embodiments, the memory 309 may be configured to store the calculated RS and SL and the associated optimal system parameter for each executed thread.

The resource manager 306 may access the memory 309 in order to set suitable parameters for a task thread based on previously stored RS and SL values. This may be further added to the training of the many core system such that previous tasks are utilized in order to set system frequency for future tasks. Thus, resource utilization will be as energy efficient as possible within the many core system.

In some embodiments, in order to not having to constantly change the system parameters based on the calculated RS and SL, the resource manager may first determine how the possible change of system parameter will affect run-time of a task thread. Thus optimal system parameters may be determined prior to actually adjusting the system parameter. This gives a faster system.

FIG. 4 illustrates an example method 400 of a trainer of a many core system comprising a plurality of cores for controlling resource utilization according to some embodiments. The method 400 may e.g. be carried out by any of the arrangements 200 or 300 or components described in FIGS. 1, 2 and 3 or by a combination of them.

The method 400 comprises scheduling 401 a plurality of task threads for execution by the many core system and adding 402 a variable load to the beginning of each scheduled task thread to be executed. The variable load may e.g. be added by a thread scheduler (e.g. the thread scheduler 201, 301 in FIGS. 2 and 3). The variable load may furthermore be proportional to a task being executed in the task thread.

The variable load may in some embodiments be determined according to $SL*(t1-t0)$, wherein t0 equals a start of a thread execution and t1 equals an end of the thread execution.

The method 400 may also comprise measuring 403 a plurality of real time requirements of the many core system for a current measurement period by a plurality of probes. The plurality of probes are ranked according to a worst case timing, e.g. in a list, wherein the worst case timing is based on the measured plurality of real time requirements (compare with intervalP and slackP in FIG. 1).

In the method 400, a training element (e.g. the training element 204, 304 of FIG. 2 and FIG. 3) may go through the plurality of probes and calculate 404 a real time slack measurement constant RS value based on the real time requirements and select 404 at least one of the plurality of probes, wherein the selected at least one probe may have a worst case RS value. The worst case RS value may be used for determining a new system load constant (SL) value for use on the thread in a subsequent execution cycle.

In some embodiments, the real time requirement may be expressed by one or more of a radio network time, network time protocol—NTP, and/or Greenwich Mean Time—

GMT—and wherein the worse case timing is a worse-case real-time behavior for each of the plurality of probes.

The method may also comprise adjusting 406 by a resource manager at least one system parameter based on the calculated RS value, wherein the adjusted system parameter is utilized in the next execution cycle.

The at least one system parameter may e.g. be at least one of a system frequency, a resource pool, and a system voltage In some embodiments, the method may further comprise that the resource manager further receives information from the training element pertaining to an effect of the adjusted system parameter on the worst case scenario and further adjust the adjusted system parameter based on the received information prior to executing the task threads.

In this way, the training element and the resource manager may constitute a training mechanism that trains the many core system to recognize a certain use case based on the calculated RS-value for each of the plurality of probes and apply the associated adjusted system parameters to that certain use case.

In some embodiments, the method may further comprise determining by the thread scheduler (e.g. the thread scheduler 201, 301 in FIGS. 2 and 3), based on RS and SL, if an amount of system resources is sufficient in one core of the plurality of cores for handling the task. If such is not the case, the method 400 may comprise determining, based on the second synthetic variable load and the worst case timing or the measured real time requirements of the plurality of probes, if the system parameters needs adjustment in one core of the plurality of cores, or in the entire plurality of cores, or in a subset of the plurality of cores in the many core system.

In some embodiments, the real time measurement constant RS may be used for determining/calculating the system load constant SL.

FIG. 5 illustrates an example method for how SL may be determined based on RS. The method 500 comprises calculating 501 RS. The method 500 may in some embodiments be combined with the method 400 of FIG. 4. In some embodiments, the method 500 may be carried out by any of the arrangements 200 or 300 or components of FIGS. 1, 2, 3 or by a combination of the arrangements and components.

RS may e.g. be calculated as described in FIG. 1.

Then, it is determined 502 if the calculated RS is above a real time threshold, i.e. the real time for executing a scheduled task may be deemed as long.

If RS is determined to be above the time threshold, then SL is increased 503, resulting in that a larger variable load is added to the task thread, thus simulating a decrease in system frequency.

If RS is determined to be beneath the time threshold, then SL is decreased 504, resulting in that a smaller variable load is added to the task thread, thus simulating an increase in system frequency.

An optimal system parameter may also be associated with the calculated RS and SL, and in some embodiments, the method may further comprise storing in a memory the calculated RS and SL and the associated system parameter for each executed thread.

The variable load SL may thus be determined by trial based on how RS changes.

Thus a history of varying RS, SL and associated system parameters may be build up for various tasks. The many core system may utilize this history in order to learn how to set RS, SL and optimal system parameters for future tasks in order to utilize its resources as energy efficient as possible.

The method 500 may according to some embodiments be used to train the many core system to recognize a certain use case based on the calculated RS-value for each of the plurality of probes and apply the associated adjusted system parameters to that certain use case.

In some embodiments, a computer program product comprising a computer readable media may store program instructions, that when executed perform the methods 400 and/or 500 of FIGS. 4 and/or 5.

FIG. 6 illustrates such a computer program product which may comprise a data-processing unit 601 and a computer readable media 600. The computer readable media 600 may e.g. be a CD-ROM, a diskette or an USB memory. The computer program product may comprise a memory (MEM) 602 and a processor (PROC) 603. The computer readable media may have stored thereon program instructions that may loaded into the memory 602 and excavated by the processor 603 when the computer program is run by the data-processing unit 601.

The described embodiments and their equivalents may be realized in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of this disclosure.

The embodiments described herein provides an accurate measurement of a many core system slack and may typically be used for the following purposes:

This solution gives an accurate measurement of the system slack and can typically be used for at least 2 purposes 1. In a running system, provide a measurement of real-time slack that may be used to scale up/down system frequency and/or change the amount pooling resources being used by the system. The running system may also determine in before-hand how a frequency change will affect the real-time requirements compared to network time, giving the system the possibility to lower the system frequency to a larger extent compared to prior solutions and still meet real-time requirements. The invention also provides for training the system so that optimal frequency schemes can be detected for new or changing real-time requirements not foreseeable at design time and not being detected by a typical idle time measurement regulator. This in turn provides a flexible solution.

2. In test rigs, the invention may give up-to-date feedback to design about how much slack can be utilized in the system for new features. In a design time type of development, the trainer can also produce static frequency schemes for the use-cases.

Embodiments may appear within an electronic apparatus (such as a wireless communication device) comprising circuitry/logic or performing methods according to any of the embodiments. The electronic apparatus may, for example, be a portable or handheld mobile radio communication equipment, a mobile radio terminal, a mobile telephone, a base station, a base station controller, a pager, a communicator, an electronic organizer, a smartphone, a computer, a notebook, a USB-stick, a plug-in card, an embedded drive, or a mobile gaming device.

Reference has been made herein to various embodiments. However, a person skilled in the art would recognize numerous variations to the described embodiments that would still fall within the scope of the claims. For example, the method embodiments described herein describes example methods through method steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims.

Hence, it should be understood that the details of the described embodiments are merely for illustrative purpose and by no means limiting. Instead, all variations that fall within the range of the claims are intended to be embraced therein.

The invention claimed is:

1. A trainer of a many core system comprising a plurality of cores for controlling resource utilization within the many core system, wherein the trainer comprises a controller configured to:
    cause a task scheduler to add a first synthetic variable load to at least one task thread comprising at least one task and to schedule the at least one task thread for execution by the many core system during a first execution cycle; wherein the synthetic variable load is added to the beginning execution of the at least one task thread scheduled;
    cause a generic probe element to set a plurality of probes configured to measure a real time requirement at a respective plurality of points within an execution of the at least one task thread during the first execution cycle and to rank the plurality of probes according to a worst case timing;
    cause a training element to calculate a real time slack measurement constant (RS) value based on the worst case timing for each of the plurality of probes and to select at least one of the plurality of probes, wherein the selected at least one probe has a worst case RS value, wherein the training element is further configured to calculate a system load constant (SL) value based on the worst case RS value, and wherein a second synthetic variable load is determined based on the selected at least one probe having the worst case RS value and the SL value for use in a second execution cycle subsequent to the first execution cycle; and to
    cause a resource manager to adjust at least one system parameter based on the at least one selected probe having the worst case RS value, wherein the adjusted system parameter is utilized in the second execution cycle and associated to the worst case RS value.

2. The trainer according to claim 1, wherein the synthetic variable load is determined according to SL*(t1−t0), wherein t0 equals a start of an execution of the at least one task thread, and t1 equals an end of the execution of the at least one task thread.

3. The trainer according to claim 1, wherein the real time requirement is expressed by one or more of a radio network time, network time protocol (NTP), and/or Greenwich Mean Time (GMT) and wherein the worse case timing is a worse-case real-time behavior for each of the plurality of probes.

4. The trainer according to claim 1, wherein the at least one system parameter is at least one of the following: a system frequency and a resource pool.

5. The trainer according to claim 1, wherein the resource manager is configured to receive information from the training element pertaining to an effect of the adjusted associated system parameter on the worst case timing and further adjust the associated system parameter based on the received information.

6. The trainer according to claim 1, wherein the training element and the resource manager constitute a training mechanism configured to train the many core system to recognize a certain use case based on the calculated RS-value for each of the plurality of probes and apply the associated adjusted system parameters to that certain use case.

7. The trainer according to claim 1, wherein the controller is further configured to cause the thread scheduler to determine, based on the second synthetic variable load and the worst case timing of the plurality of probes, if the system parameters needs adjustment in one core of the plurality of cores, or in the entire plurality of cores, or in a subset of the plurality of cores in the many core system.

8. A method of a trainer of a many core system that comprises a plurality of cores for controlling resource utilization within the many core system, the method comprising:
    add a first synthetic variable load to at least one task thread comprising at least one task and to schedule the at least one task thread for execution by the many core system during a first execution cycle; wherein the synthetic variable load is added to the beginning execution of the at least one task thread scheduled;
    set a plurality of probes configured to measure a real time requirement at a respective plurality of points within an execution of the at least one task thread during the first execution cycle and to rank the plurality of probes according to a worst case timing;
    calculate a real time slack measurement constant (RS) value based on the worst case timing for each of the plurality of probes and to select at least one of the plurality of probes, wherein the selected at least one probe has a worst case RS value, and to calculate a system load constant (SL) value based on the worst case RS value, and wherein a second synthetic variable load is determined based on the selected at least one probe having the worst case RS value and SL value for use in a second execution cycle subsequent to the first execution cycle; and to
    adjust at least one system parameter based on the selected at least one probe having the worst case RS value, wherein the adjusted system parameter is utilized in the second execution cycle and associated to the worst case RS value.

9. The method according to claim 8, wherein the synthetic variable load is determined according to SL*(t1−t0), wherein t0 equals a start of an execution of the at least one task thread, and t1 equals an end of the execution of the at least one task thread.

10. The method according to claim 8, wherein the real time requirement is expressed by one or more of a radio network time, network time protocol (NTP), and/or Greenwich Mean Time (GMT) radio network time and wherein the worse case timing is a worse-case real-time behavior for each of the plurality of probes.

11. The method according to claim 8, wherein the at least one system parameter is at least one of the following:
a system frequency and a resource pool.

12. The method according to claim 8, wherein the method further comprises:
receiving by a resource manager information from a training element pertaining to an effect of the adjusted associated system parameter on the worst case timing and further adjust the associated system parameter based on the received information.

13. The method according to claim 8, wherein the training element and the resource manager constitute a training mechanism that trains the many core system to recognize a certain use case based on calculated RS value for each of the plurality of probes and apply the associated adjusted system parameters to that certain use case.

14. The method according to claim 8, wherein the method further comprises:
determining, based on the second synthetic variable load and the measured real time requirement of the plurality of probes, if the system parameters needs adjustment in one core of the plurality of cores, or in the entire plurality of cores, or in a subset of the plurality of cores in the many core system.

15. A nontransitory computer readable medium, having thereon a computer program comprising program instructions, the computer program being loadable into a data-processing unit comprising a processor and a memory and adapted to cause the data-processing unit to execute a method when the computer program is run by the data-processing unit, wherein the method is of a trainer of a many core system that comprises a plurality of cores for controlling resource utilization within the many core system, the method comprising:
add a first synthetic variable load to at least one task thread comprising at least one task and to schedule the at least one task thread for execution by the many core system during a first execution cycle; wherein the synthetic variable load is added to the beginning execution of the at least one task thread scheduled;
set a plurality of probes configured to measure a real time requirement at a respective plurality of points within an execution of the at least one task thread during the first execution cycle and to rank the plurality of probes according to a worst case timing;
calculate a real time slack measurement constant (RS) value based on the worst case timing for each of the plurality of probes and to select at least one of the plurality of probes, wherein the selected at least one probe has a worst case RS value, and to calculate a system load constant (SL) value based on the worst case RS value, and wherein a second synthetic variable load is determined based on the selected at least one probe having the worst case RS value and SL value for use in a second execution cycle subsequent to the first execution cycle; and to
adjust at least one system parameter based on the selected at least one probe having the worst case RS value, wherein the adjusted system parameter is utilized in the second execution cycle and associated to the worst case RS value.

* * * * *